US006638170B1

(12) United States Patent
Crumby

(10) Patent No.: US 6,638,170 B1
(45) Date of Patent: Oct. 28, 2003

(54) GAMING DEVICE NETWORK

(75) Inventor: Hardy Lee Crumby, Fernley, NV (US)

(73) Assignee: IGT, Reno, NV (US)

( * ) Notice: Subject to any disclaimer, the term of this patent is extended or adjusted under 35 U.S.C. 154(b) by 0 days.

(21) Appl. No.: 09/688,783

(22) Filed: Oct. 16, 2000

(51) Int. Cl.[7] .................................... A63F 13/00
(52) U.S. Cl. .................................... 463/42; 463/39
(58) Field of Search .................................... 463/39, 40, 41, 463/42; 455/73; 375/219, 239, 295, 297, 303, 316, 334; 370/318, 343, 349, 434, 913

(56) References Cited

U.S. PATENT DOCUMENTS

| | | | | |
|---|---|---|---|---|
| 5,046,066 A | * | 9/1991 | Messenger | 370/349 |
| 5,605,506 A | * | 2/1997 | Hoorn et al. | 463/47 |
| 6,018,650 A | * | 1/2000 | Petsko et al. | 455/234.1 |
| 6,296,101 B1 | * | 10/2001 | Hasegawa et al. | 194/217 |
| 6,354,946 B1 | * | 3/2002 | Finn | 463/40 |

FOREIGN PATENT DOCUMENTS

| | | | | |
|---|---|---|---|---|
| WO | WO 98/47589 | * 10/1998 | | A63F/9/24 |

OTHER PUBLICATIONS http://www.bluetooth.net. Date Obtained: Jan. 24, 2000. p. 1–9.

*Popular Mechanics Bluetooth Sinks In*. By Kim Komando. p. 28–29. Feb. 2000.

*Test System Validation Guideline*. Bluetooth™. p. 1–19. Jun. 9, 2000.

*Bluetooth Security Architecture*. Responsible: Thomas Muller. p. 1–33. Version 1.0. Jul. 15, 1999.

*Bluetooth Protocol Architecture*. Responsible: Riku Mettala. p. 1–20. Version 1.0. Aug. 25, 1999.

*Specification of the Bluetooth System*. Bluetooth™. p. 17–27, 41–58, 191. vol. 1.0 B. Dec. 1, 1999.

* cited by examiner

*Primary Examiner*—Kim Nguyen
(74) *Attorney, Agent, or Firm*—Weide & Miller, Ltd.

(57) ABSTRACT

A method and apparatus for establishing a data network between gaming devices is disclosed. In one embodiment a wireless communication system facilitates communication between gaming devices or communication between gaming devices and a server or central site. Wireless communication overcomes the drawbacks associated with wired networks that occur when the gaming devices are moved from one location to another by individuals not trained as computer network technicians. In one configuration the wireless network adopts a packet based communication protocol with transmit and receive processing layers. To achieve improved communication performance and reliability the transmitter may operate at about 2.4 GHz transmit frequency and adopt FSK type coding. In one embodiment a concentrator connects via a wireless or hardwired connection to a main server or hardwired LAN to thereby serve as a main hub to facilitate communication between a plurality of gaming devices and the server.

7 Claims, 3 Drawing Sheets

GAMING DEVICE NETWORK

FIELD OF THE INVENTION

The present invention relates to gaming devices and more specifically to a system for achieving communication between gaming terminals.

BACKGROUND OF THE INVENTION

Gaming is a popular source of entertainment. One type of gaming is gambling, such as might occur in a casino. Another type of gaming is participation in video based contest, such a video game.

In the past, gaming devices, and in particular, gambling devices, were self-contained. Today, however, gaming devices are commonly linked together or linked to a central site. By linking the gaming devices together or to a central site, a gaming operator can monitor or control the operation of the gaming devices from a remote location. Multiple devices may also be linked together for the purpose of establishing jackpots. As is commonly understood, a jackpot system involves a plurality of gaming devices that share a large, common jackpot. This requires communication between the individual devices and, in some situations, communication between independent gaming locations/casinos.

In the past, the communication medium for these gaming device networks comprised a circuit including wire cables carrying electrical charges (i.e. copper wire, coaxial cable, or twisted pair cable). These circuits are generally connected to each gaming device (client) and a server or host device. Communication occurs between the gaming device and server over the wire cables.

The prior art method and apparatus of using a hardwired network for communicating between gaming devices and the central server has many drawbacks. One problem arises from the frequent rearrangement of gaming devices within a gaming area, such as the casino floor. There are a variety reasons for moving gaming devices. For example, new games may be purchased, a new casino floor configuration is desired to accommodate a special event, such as a boxing match or a slot or video poker tournament, or it may be desired to offer gaming at a remote location, such as by a swimming pool or in a banquet hall.

Regardless of the reason for moving the gaming devices, it can be problematic to the network links. For example, it is time consuming and disruptive to re-route network wiring to each gaming device every time the casino moves a gaming device. Another drawback of prior art systems is that the wire-based network links, and the connectors attached thereto, often break after repeated use and re-routing by casino maintenance personnel. As a result the devices may become non-operational causing the casino to lose revenue.

Another problem with the prior art gaming networks arises from the casino environment. Numerous electrical and magnetic fields (EMF) are present in a casino. EMF may arise from people walking on the carpet or by the various electrical and electronic apparatus in the casino. The electric charge and EMF may discharge into or interfere with the wired network or corrupt data on the network.

Another drawback of prior art gaming networks when located in a casino environment results from the use of heavy wheeled carts or carriers. The weight of the cart, often full of coin money, is concentrated on the small surface area of the cart wheels. Because the network links must often be routed under carpeting, the weight of a cart can crush the network link causing a network failure.

Yet another drawback with prior art gaming networks arises from their complexity. To maintain, route, and re-route hardwired network links requires a substantial amount of knowledge and skill. Casinos must employee skilled technicians for these tasks. Maintaining a large staff of skilled technicians is costly to casinos or other gaming establishments. It is therefore desirable to make the gaming networks less complex to install, maintain and re-route.

Thus, there is a need for a system that achieves communication between gaming devices and overcomes the drawback associated with the prior art.

SUMMARY OF THE INVENTION

The invention overcomes the disadvantages and drawbacks associated with the prior art by providing a wireless network to facilitate communication between gaming devices or between gaming devices and a server or host. Linking gaming devices and a server with a wireless network overcomes the drawbacks of the prior art by providing a communication network that is simple to install and re-configure after one or more of the gaming devices has been moved. In addition, a wireless network does not require hardwired cable connections. As a result, the gaming network adopting the wireless technology as described herein may be implemented in areas that are not conducive to wired networks. For example, the wireless network may be utilized in areas that do not have cabling such as pool areas or banquet rooms and in areas where cabling could be damaged by heavy carts and the like. Moreover, the processing apparatus and receiver/transmitter system of the wireless communication system are contained within the gaming device. To establish the network, the gaming device needs only to be powered up. This simplifies gaming device network setup thereby reducing the number of highly trained technical personal required to re-establish the network if the gaming devices have been moved.

In summary, the invention comprises a wireless communication system to create a gaming device network. In one embodiment the network assumes a configuration with a concentrator, the concentrator being linked to a server. In this embodiment the concentrator and the wireless devices communicate via a wireless channel. The gaming devices may also communicate directly with one another via a wireless channel. In this manner, the gaming devices and computers on the network are able to exchange gaming data to facilitate operation of modern gaming systems.

In one configuration the wireless network adopts a packet based communication scheme and is configured with a plurality of processing layers in the communication protocol. Compatibility with other communication protocols, such as TCP/IP, is also contemplated. Numerous other aspects of the invention are discussed herein which make the invention particularly well suited for use in a casino environment where reliability, security, and compatibility are required.

Further objects, features, and advantages of the present invention over the prior art will become apparent from the detailed description of the drawings which follows, when considered with the attached figures.

DETAILED DESCRIPTION OF THE INVENTION

The invention comprises a method and apparatus for enabling communication between gaming devices. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention. The various features of the invention may be utilized alone or in any combination.

Figure 1:
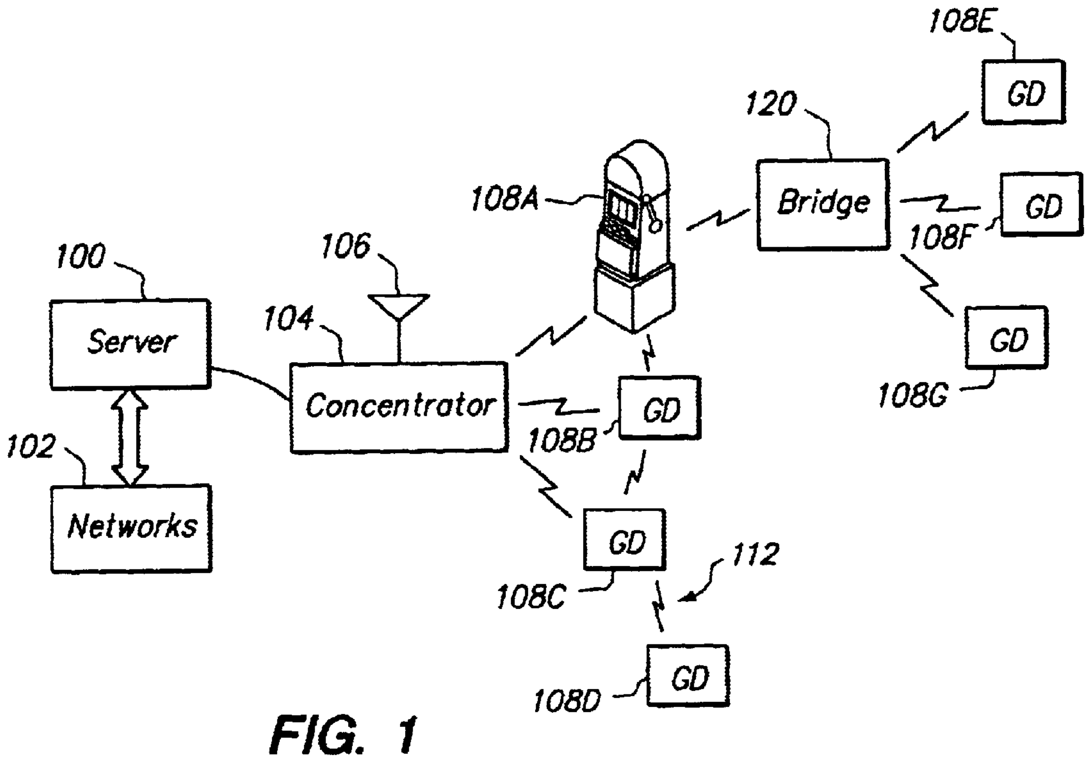
FIG. 1 illustrates a block diagram of an example configuration of a wireless gaming network.

FIG. 1 illustrates an example configuration of a wireless gaming network configured in accordance with the principles of one embodiment of the invention. A computer or server 100 performs network processing and other gaming accounting or security functions. For example, the server system 100 may monitor and control gaming device operation, gaming device pay-out structures, jackpot calculation, ticket pay system operation, security monitoring, software or data uploading or downloading, player tracking and award systems, player interface services, or any other server based function. It is contemplated that the server 100 may communication with one or more other computing devices 102.

In this example configuration the server 100 links to a concentrator 104 via a communication medium, including but not limited to, fiber optic cable, Ethernet cabling, twisted pair cabling, coaxial cable, or wireless communication. The concentrator 104 comprises an apparatus configured to interface with one or more wireless communication enabled gaming devices 108 and the server 100. The concentrator 104 is configured to allow a large number of devices or circuits to share either a single circuit or a smaller number of circuits. Hence, traffic is concentrated through a process of multiplexing and utilization of high bandwidth medium. It is contemplated that the concentrator 100 may operate as a packet switching device or circuit based device. One example of the concentrator 100 is a multistation access unit (MAU) that concentrates traffic from multiple nodes of a network to a backbone. In other embodiments the concentrator 104 may be replaced with or incorporated with one of the gaming devices 108.

In the embodiment described herein the concentrator includes wireless communication apparatus, shown for purposes of understanding with an antenna 106. In other embodiments the antenna 106 used to achieve wireless communication is contained within the concentrator 104 or gaming device 108, or on an integrated circuit.

The concentrator 104 communicates with one or more gaming devices 108A–108C via a wireless channel. The wireless channel may comprise any wireless channel capable of accurately and securely conveying information between transmitting and receiving devices. The gaming devices 108 and the concentrator 104 form a wireless data exchange network. It is further contemplated that the gaming devices may utilize an inter-device channel 112 to facilitate communication between gaming devices 108. It is also contemplated that the communication between gaming device 108D and the concentrator 104 occur via gaming device 108C such that gaming device 108C serves as a bridge to gaming device 108D if it is not within range of the concentrator.

The wireless network system shown in FIG. 1 also includes a dedicated bridge 120 configured to facilitate communication with one or more remote gaming devices 108E–108G. The bridge comprises a data communication device that connects two or more network segments and forwards or exchanges data between two or more network segments. The bridge 120 may also serve as a repeater for broadcast or multicast packet transmissions. Using the bridge 120, the server 100 may communicate with the gaming devices 108E, 108F, 108G that are out of range of the concentrator 104.

Figure 2:
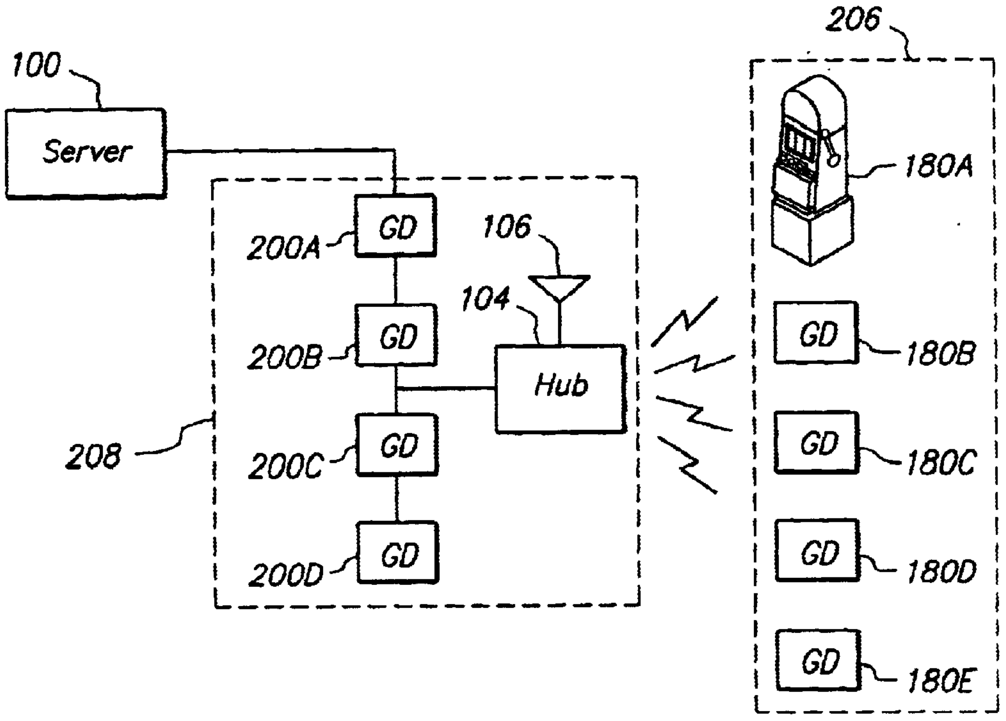
FIG. 2 illustrates a block diagram of an alternative configuration of a wireless gaming network.

It should be understood that this is but one example configuration for a wireless network that might be used to conveniently link gaming devices into a computerized network to achieve information exchange. Other configurations are contemplated. For example, FIG. 2 illustrates an alternative configuration wherein the server communicates with several gaming devices 200 in a traditional manner using a wired network 208. One or more concentrators 104 link to the wired network to integrate a wireless network portion 206 into the wired network 208. This may be desirable for integration with existing networks 208, or to link remotely located gaming devices 206 to an existing network.

Figure 3:
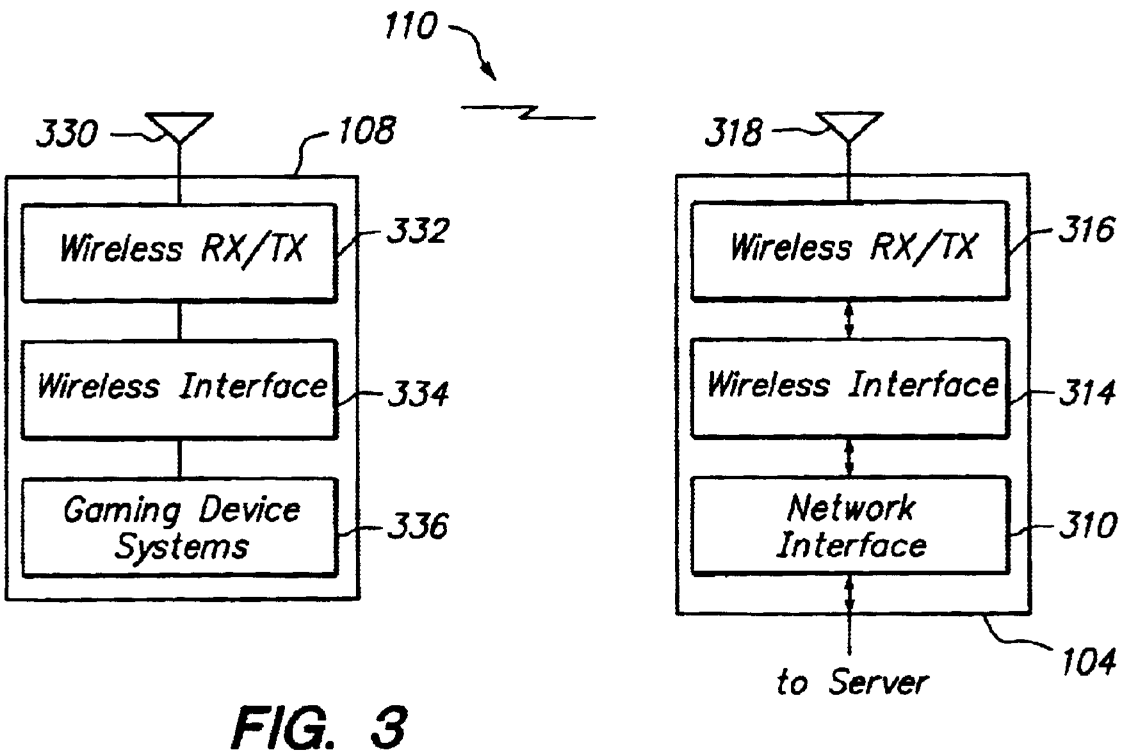
FIG. 3 illustrates a more detailed block diagram of the communication and processing apparatus of a wireless gaming network.

FIG. 3 illustrates a more detailed block diagram of the apparatus of a wireless gaming networks As shown, a gaming device 108 communicates with the concentrator 104 over a wireless channel 110. The apparatus is now described as would be encountered by a signal or data traveling from the server (not shown) to the gaming device 108. It is assumed a signal arrives at the concentrator 104 from the server or other central site in a known manner. A network interface 310 receives the signal and performs processing on the signal. The network interface 310 comprises hardware and software configured to receive data over a medium, process the data, including optional error checking and optional security features, and present the processed data to one or more other systems. In one embodiment communication between the concentrator 104 and the server are governed by the OSI seven layer model for a packet switched network. In another embodiment, the network interface 310 receives data, over a 10 Mbit or 100 Mbit Ethernet line or a fiber optic cable, and may convert the data into packets.

The network interface 310 communicates with a wireless interface 314. The wireless interface 314 comprises a configuration of hardware and software configured to process data received from the network interface 310 for transmission over a wireless network.

After processing the data, the wireless interface 314 communicates the data to a wireless transmitter/receiver (hereinafter Tx/Rx) 316. The Rx/Tx 316 modulates the data onto a carrier signal and transmits the modulated signal via an antenna 318.

The antenna may comprise any device capable of generating radio waves. Although the antenna 318 is shown as an external device, it is contempalted that the antenna could reside within the gaming device or on a single chip or integrated circuit (I.C.).

The range of the radio transmission between the concentrator 104 and the gaming devices 108 may be made variable based on the particular needs of the gaming device arrangement. In one embodiment the range may be set to either of two levels, i.e. a first short range power transmission level and a second long range power transmission level. It is further contemplated that a transmitting device and a receiving device may automatically adjust the power level at which transmission occurs to achieve ideal operation.

The gaming device 108 receives the signal from the concentrator 104 using a gaming device antenna 330. The gaming device antenna 330 may comprise an antenna similar to the antenna 318 of the concentrator 104 or any antenna having a configuration suited for use with the gaming device 108. After receipt by the antenna 330, the signal progresses to the gaming device wireless transmitter/receiver (hereinafter gaming device Rx/Tx) 332. In one embodiment the wireless transmitter/receiver 332 is similar to the Tx/Rx of the concentrator 104, and hence is not described in great detail.

The gaming device Rx/Tx couples to a wireless interface 334. In one embodiment the wireless interface 334 of the gaming device 108 is generally similar to the wireless interface 314 of the concentrator. The wireless interface 334 reverses the operations preformed by the wireless interface 314.

The output of the wireless interface 334 couples to the gaming device systems 336. The gaming device systems 336 comprise the systems of gaming device that interfaces with a server or other remote network device.

In one embodiment the communication protocol between gaming devices comprises a packet switched network approach. In another embodiment the devices communicate based on a circuit or channel based communication protocol. In yet another embodiment the gaming devices and/or the concentrator adopts a communication protocol that utilizes aspects of a packet based system and aspects of a channel based communication system. The term channel should not be limited to frequency channel, but may also include a specific identification code associated with a transmission to designate the channel or frequency.

In an alternative embodiment the wireless device is an add-on device configured to connect to an existing port of a gaming device. In this manner wireless capability could be added to existing systems or network.

Figure 4:
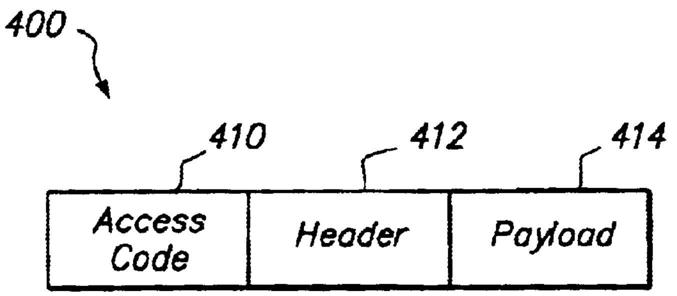
FIG. 4 illustrates an example configuration of a packet.

FIG. 4 illustrates an exemplary packet as might be used with the wireless communications system of the invention. The exemplary packet 400 includes an access code portion 410, a header portion 412 and a payload portion 414. In one embodiment the bit ordering within the packet comprises the Little Endian Format.

The access code portion 410 contains data used for synchronization, DC offset compensation and identification. The access code 410 may also be used to identify a particular channel identifier so that devices engaging in a communication session may share common bandwidth. In one embodiment the access code is 72 bits in size. In another embodiment the access code is 68 bits in size. In one configuration the access code includes sub-parts such as a preamble, a sync word, or an optional trailer. The preamble may be used for DC compensation. The sync word may be used for timing and synchronization of the communications. The optional trailer may be used if a packet header follows the access code.

The header portion 412 of the packet 400 stores link control information. The type of information that may be stored in the header portion 412 of the packet 400 comprises packet type information, packet acknowledgment information, error checking information, sequencing information and flow control information. In one embodiment the header 412 size is 18 bits.

The payload portion 414 of the packet 400 contains the data of the packet 400. In one embodiment the payload size ranges from zero bits, if the packet is for network overhead, up to a maximum of 2745 bits. Of course, it is contemplated that the packet size be selected to suit particular needs of the network and data.

One possible environment of use of the wireless network is in a gaming environment, such as a casino. As a result, provisions are contemplated for data and network security. In one embodiment the security provisions comprise inclusion of authentication capability and encryption capability. One embodiment of the wireless gaming network described herein utilizes an authentication procedure that adopts a challenge-response scheme. Using this scheme a first device sends a signal containing a random number to a second device. Upon receipt, the second device calculates a response that is a function of the received random number, using a code associated with the second device and a secret code or key.

There after the second devices sends this response to the first device and the first device determines if the response is accurate. For a successful response to be calculated, the first device and the second device must share the same secret key. If the first device calculates or receives an unauthorized response communications are terminated. Because the secret key is unknown to other devices or unauthorized individuals, this form of authentication provides a level of security.

In a variation of this embodiment, a second level of authentication is provided by creating a second unique key that controls further communication between the first device and the second device after the first authentication process successfully occurs. In one method of operation, the second unique key must accompany communication signals between the devices for successful operation.

In yet another embodiment, communication between the gaming devices and/or the concentrator is encrypted to achieve secure communication. In one embodiment the wireless network may adopt an encryption key. Encryption prevents the wireless communication from being understood if it is received by an unauthorized receiver, or from any unauthorized transmitter inputting fraudulent data on to the network.

Figure 5:
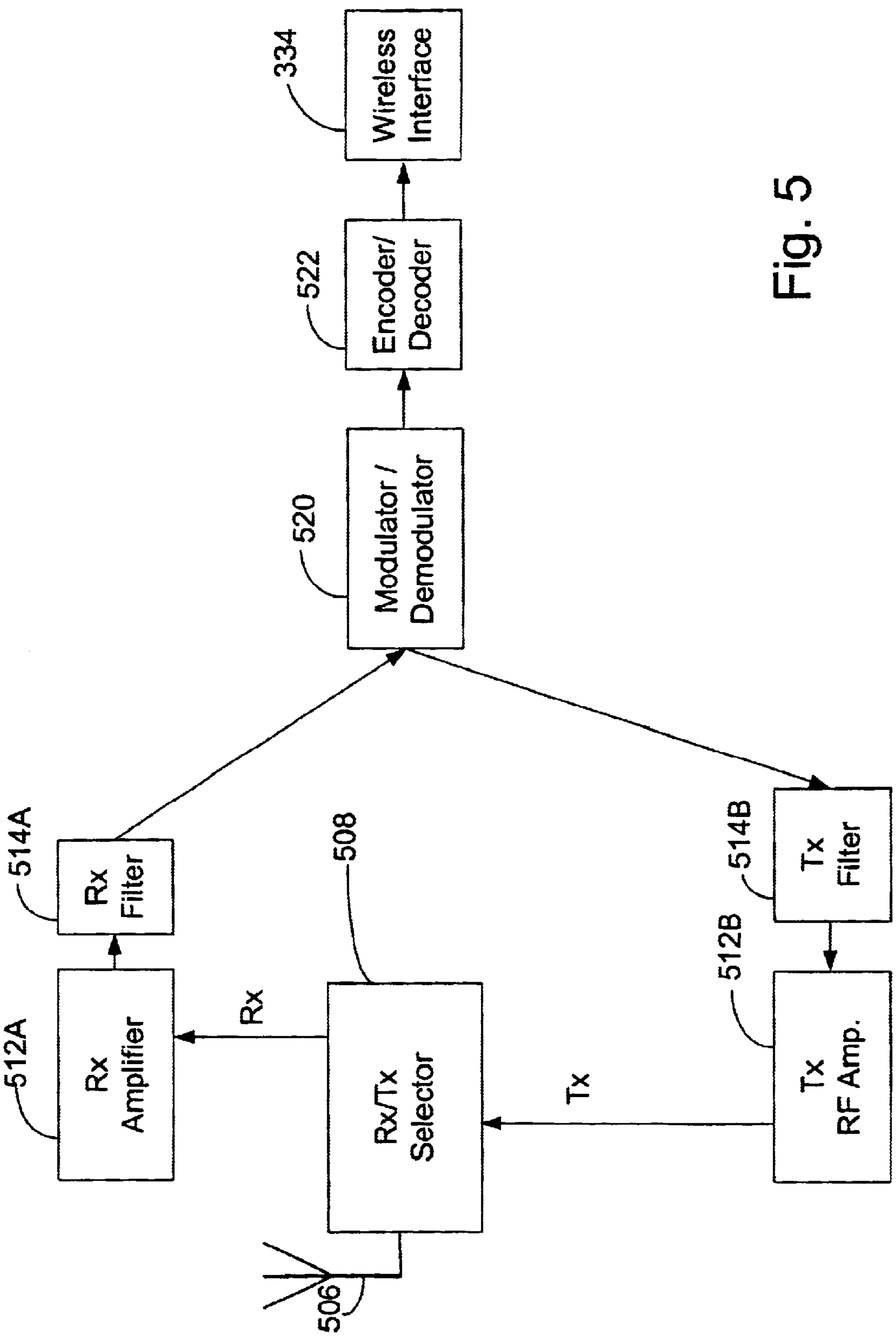
FIG. 5 illustrates a block diagram of an example configuration of a transceiver.

FIG. 5 shows an example configuration of a gaming device communication system in more detail. This is merely an example embodiment and is provided for purposes of illustration. Other configurations having additional or fewer aspects are contemplated. As shown, the antenna 506 connects to a Rx/Tx selector 508. The Rx/Tx selector 508 controls access to the antenna 506 to prevent corruption of inbound and outbound signals. One or more amplifiers 512 connect to the Rx/Tx selector 508. The amplifiers 512 are configured to increase the power level of the otherwise weak signal from the antenna 506 or to increase the power level of an outbound signal before being presented to the antenna. In one embodiment the amplifier 512B is configured to transmit at various power levels. In one embodiment the transmit power level ranges from 100 mW to 1 mW. In another embodimentt the transmit power level ranges from 2.5 mW to 0.25 mW. In another embodiment the transmit power level is fixed at 1 mW. It is contemplated that the receiver system dynamically vary the transmit power depending on the particular needs of the devices and channel characteristic.

One or more filters 514 couple to the amplifier 513. The one or more filters 514B selectively control the range of frequencies of an inbound signal that are presented to the other components of the receiver system. The filter also regulates the frequency of the outbound signal that travel to the antenna 506. The filters 514 operate in conjunction with a modulator/demodulator module 520. The demodulation system 520 removes the baseband signal from the modulated inbound signal that is composed of both baseband and carrier band signal components. In one embodiment the demodulator 520 and filter 514 are configured to have an actual sensitivity of −70 dB or better and a bit error rate of less than or equal to 0.1%.

The modulator portion of the modulator/demodulator module 520 associates the baseband signal with a carrier frequency. In one embodiment modulation occurs at about 900 MHz. In another embodiment modulation occurs at about 2.4 Ghz. If modulation occurs at about 2.4 Ghz, the available total bandwidth may be 83.5 MHz. The 83.5 MHz bandwidth may be divided into 23 channels. In another embodiment the 83.5 MHz bandwidth is divided into 79 channels. In one configuration channel spacing is 1 MHz.

The modulator/demodulator module 520 couples to an encoder/decoder module. The encoder/decoder module 522 performs encoding on the outbound signal and decoding on the inbound signal as may be necessary to more fully utilize the available bandwidth and reduce errors in transmission. In one embodiment the coding, modulation and general method of operation adopts FSK (frequency shift keying). The encoder/decoder module 522 may also perform error checking and various security functions such as encryption. Time slot division may also be adopted. In one embodiment time slots of 625 μs are used and may be numbered based on a clock signal. A TTD scheme may be used wherein a first device transmits in even numbered time slots and a second device transmits in odd numbered time slots.

As shown in FIG. 3, the encoder 522 communicates with one or more other aspects of the wireless interface 334. In one example embodiment the wireless interface is structured with a protocol stack type method of operation. In such a configuration, there exist numerous processing layers such that a first layer communicates with a second layer, and so on up to an Nth layer. N can be any integer. The various layers perform processing on the inbound and outbound packets. The Nth layer of the stack communicates with the systems of the gaming device.

In one particular configuration, the protocol stack of the wireless interface comprises a four layer model including a layer for the core protocols and a layer for interfacing with other networking protocols. In one configuration, the core protocols include a baseband layer and a link control layer. The baseband and link control layer may be configured to enable a physical RF link between gaming devices. In some embodiments a link manager protocol is included for communication set-up between gaming devices. This may include security aspects such as authentication and encryption. This may occur by generating, exchanging, and checking link and encryption keys and controlling and negotiating baseband packet sizes. The link manage protocol may also control the power modes. In one embodiment the protocol layers may include logical link control and adaptation protocols that are configured to adapt upper layer protocols over the baseband. The adaptation protocol layers allow the gaming devices to interact with or adopt other networking protocols. It is contemplated that the gaming devices may interact with PPP (point-to-point protocol), TCP/IP, or WAP (wireless application protocol)

It will be understood that the above described arrangements of apparatus and the method therefrom are merely illustrative of applications of the principles of this invention and many other embodiments and modifications may be made without departing from the spirit and scope of the invention as defined in the claims.

I claim:

1. A communication network comprising:

a first gaming device comprising:

a first gaming processor configured to execute gaming software;

a first network interface configured to interface the first gaming processor to a network;

a first wireless transceiver coupled to the first network interface and configured to communicate over a wireless channel;

a second gaming device comprising;

a second gaming processor configured to execute gaming software;

a second network interface configured to interface the second gaming processor to the network;

a second wireless transceiver coupled to the second network interface and configured to communicate over a wireless channel;

a concentrator comprising:

a server interface configured to communicate with a server computer; and a third wireless transceiver configured to communicate over a wireless channel with the first wireless transceiver and the second wireless transceiver;

a bridge or repeater comprising a fourth wireless transceiver configured to provide a communication link between the second wireless transceiver and the concentrator when the second wireless transceiver is out of range of the concentrator.

2. The communication network of claim 1, wherein the wireless transceivers operate at about 2.4 GHZ carrier frequency.

3. The communication network of claim 1, wherein the network interfaces are configured to exchange packets over the wireless channel.

4. The communication network of claim 3 wherein at least one of the packets comprises an access code portion, a header portion, and a payload portion.

5. The communication network of claim 1, wherein the first and second wireless transceivers utilize a frequency shift keying coding system to communicate over a wireless channel.

6. The communication network of claim 1, wherein the first and second wireless transceivers transmit signals at a variable power levels.

7. The communication network of claim 1, wherein the first gaming device and the second gaming device are located in a casino and the second gaming device movable by casino personnel.

* * * * *